Oct. 2, 1956   J. A. VERTSON   2,765,147
DRILL PIPE SHOCK ABSORBER
Filed Feb. 8, 1952   3 Sheets-Sheet 1
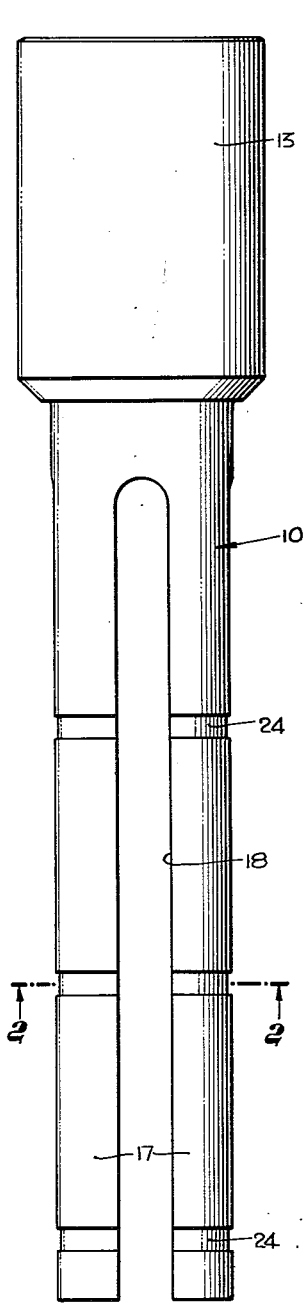
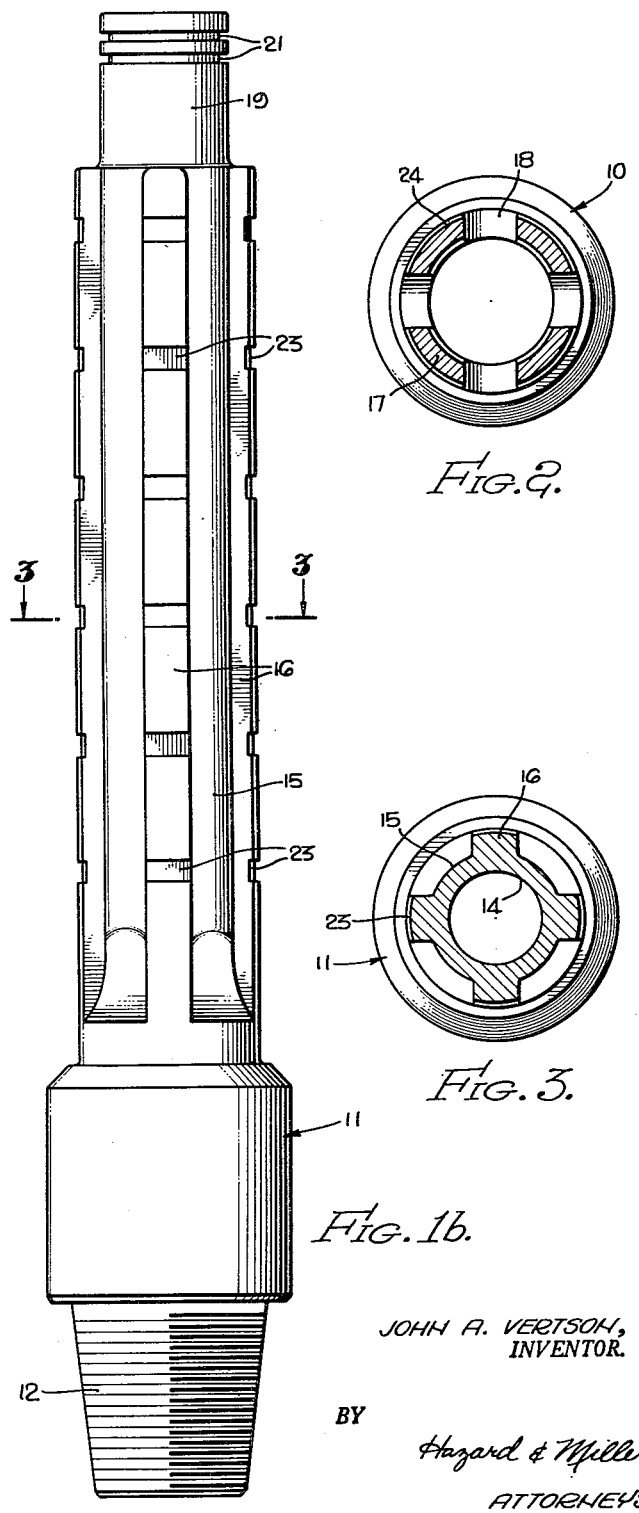
JOHN A. VERTSON,
INVENTOR.
BY
Hazard & Miller
ATTORNEYS

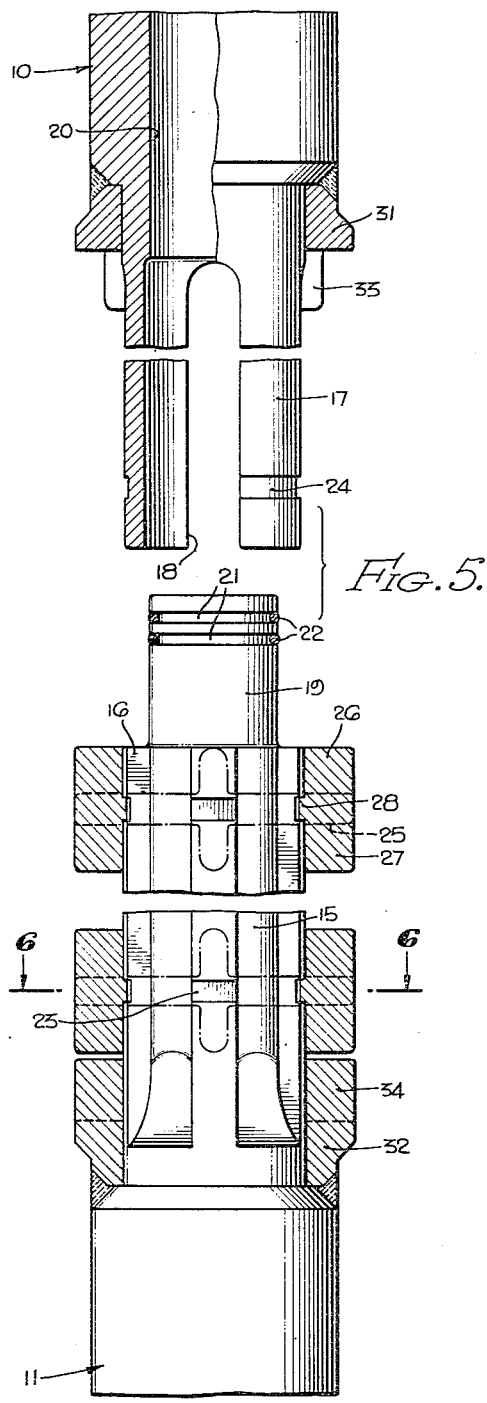

Oct. 2, 1956  J. A. VERTSON  2,765,147
DRILL PIPE SHOCK ABSORBER
Filed Feb. 8, 1952  3 Sheets-Sheet 3

JOHN A. VERTSON,
INVENTOR.

BY
Hazard & Miller
ATTORNEYS

United States Patent Office 2,765,147
Patented Oct. 2, 1956

2,765,147

DRILL PIPE SHOCK ABSORBER

John A. Vertson, Brea, Calif.

Application February 8, 1952, Serial No. 270,578

7 Claims. (Cl. 255—28)

This invention relates to a drill pipe shock absorber adapted to be incorporated in the drilling string of a rotary well drilling apparatus.

Recent advances in the drilling of oil and gas wells by means of a rotary well drilling apparatus have required the imposition of high weights on the well drilling bits and the rotation of the well drilling string at relatively high speeds. These conditions impose severe shocks and strains upon the drill pipe. As the drill string rotates severe vibration may be set up by the rotating bit and transmitted therefrom through the drill collar to the drill pipe. These vibrations and shocks tend to weaken and fatigue the metal of the drill string.

An object of the present invention is to provide a type of shock absorber that is preferably incorporated in the drilling string immediately above the drill collar but which may be incorporated in the drilling string at other locations as well. Such a shock absorber avoids the transmission of shocks generated by the drilling bit through the drill collar directly to the drill pipe and consequently prolongs the useful life of the drilling string. The shock absorber, however, is so designed that it will adequately transmit torque required to rotate the drilling bit and, while a limited amount of axial movement of the parts is permissible, this is yieldably resisted in such a manner that in the event that the drill pipe becomes stuck in the well exceedingly high forces such as are occasioned by the use of jars may be imposed in freeing the pipe without causing a separation of the parts of the shock absorber.

With the foregoing and other objects in view, which will be made manifest in the following detailed description and specifically pointed out in the appended claims, reference is had to the accompanying drawings for an illustrative embodiment of the invention, wherein:

Figure 1a is a view in side elevation of the upper part of the body of the improved shock absorber;

Fig. 1b is a view in side elevation of the lower part of the body of the shock absorber;

Fig. 2 is a horizontal section taken substantially upon the line 2—2 upon Fig. 1a;

Fig. 3 is a horizontal section taken substantially upon the line 3—3 upon Fig. 1b;

Fig. 4 is a perspective view of one of the rings that are employed in association with the body parts when the body parts are assembled together;

Fig. 5 is a view parts of which are illustrated in vertical section illustrating the manner in which parts of the shock absorber are assembled together;

Fig. 6 is a horizontal section taken substantially upon the line 6—6 upon Fig. 5;

Figure 7:
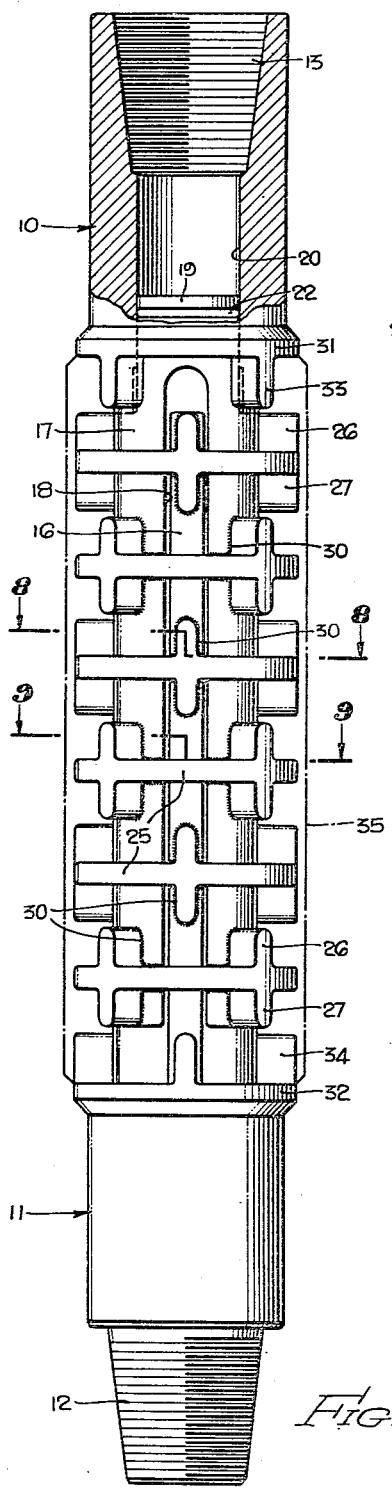
Fig. 7 is a view in side elevation of the assembled parts of the body of the shock absorber prior to the application of rubberlike material thereto.

Referring to the accompanying drawings wherein similar reference characters designate similar parts throughout, the improved shock absorber consists of two body parts generally indicated at 10 and 11. Each of these body parts adjacent one end thereof is provided with means for its attachment or incorporation in a rotary well drilling string. To this end the part 11 is shown as being equipped at its lower end with a threaded pin 12 and the upper end of the part 10 is illustrated as being equipped with an internally threaded box 13. Any other or preferred means which will enable the insertion or incorporation of the shock absorber in the drilling string may be employed if so desired. The body part 11 is tubular throughout its length, as indicated by the presence of the central bore 14 that extends longitudinally therethrough. This body part is externally grooved with vertical grooves 15 that constitute splineways. These grooves are defined from each other by radial ribs or splines 16. The grooves 15 are adapted to somewhat loosely receive fingers or splines 17 on the body part 10 which are defined from each other by slots 18 which loosely receive the ribs 16 when the parts are assembled together. The upper end of the body part 11 is reduced, as indicated at 19, and slidably extends into the cylindrical bore 20 formed in the bottom of the box 13. This portion 19 may be provided with one or more ring grooves 21 designed to receive sealing rings such as O-rings 22 that will effectively prevent the leakage or escape of circulation fluid that is pumped down through the drilling string and through the central bore 14.

Figure 8:
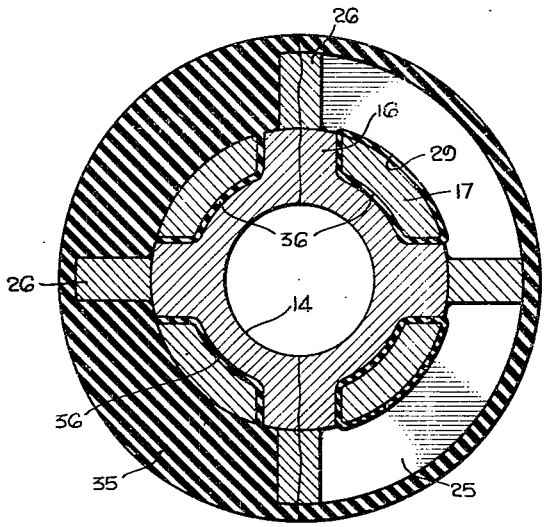
Fig. 8 is a horizontal section taken substantially upon the line 8—8 upon Fig. 7.
Figure 9:
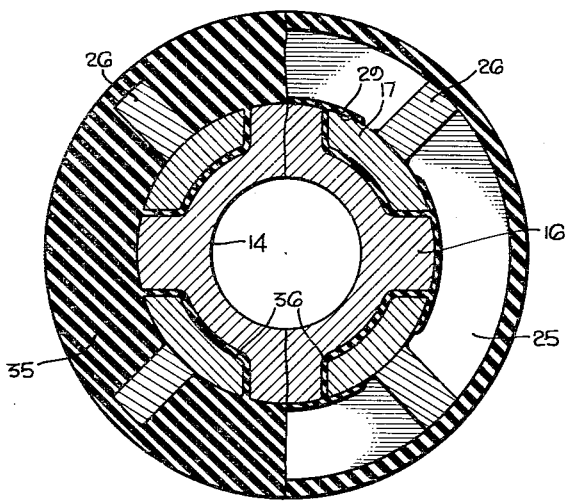
Fig. 9 is a horizontal section taken substantially upon the line 9—9 upon Fig. 7.

On the exterior surfaces of the ribs 16 there are a plurality of equally spaced horizontal notches or grooves 23. In a similar manner on the exterior of the fingers or splines 17 there are horizontal grooves or notches 24. The number of grooves 24, however, need only be approximately one-half the number of grooves 23 on the ribs 16 as the grooves 24 are intended to register with or become aligned with only alternate grooves 23. A plurality of rings are provided one of which is illustrated in Fig. 4. These rings have relatively flat body portions 25 and upwardly and downwardly extending fins 26 and 27 thereon. Opposite the inner end of each pair of fins there is an inwardly extending boss 28. The internal diameter between diametrically opposed bosses 28 is equal to the diameter across diametrically opposed grooves 23 on the ribs 16. In assembling the rings and the parts of the body a plurality of rings 25 are telescoped onto the body part 11 with the bosses 28 slipping downwardly through the grooves 15 until a ring is opposite a groove 23. Each ring is then partially rotated so that its bosses 28 enter and occupy the grooves 23. In such a position all of the fins 26 and 27 on all of the rings are in vertical alignment with each other and are disposed outwardly of the ribs 16. The body part 10 is then slipped downwardly onto the body part 11, as depicted in Fig. 5, with the fingers or splines 17 passing downwardly through the grooves 15 and through the recesses 29 on the interior of the rings which are between the bosses 28. With the parts thus assembled and the grooves 24 disposed in alignment or in registration with alternate grooves 23, alternate rings 25 are then partially rotated so as to slide the bosses 28 from the grooves 23 into the grooves 24. Intermediate rings 25 are left in position with their bosses 28 occupying intermediate grooves 23 on the ribs 16. The rings and their fins consequently assume a staggered relation with respect to each other, as depicted in Fig. 7, wherein the uppermost complete ring has its fins overlying the ribs or splines 16 on the lower part 11. The next subjacent ring has its fins overlying the fingers or splines 17 of the body part 10. The rings are welded to the body parts in these positions as indicated by the welds 30. Prior to the assembly of the device, half rings 31 and 32 are slipped onto the body parts 10 and 11, respectively, and are welded thereto so as to provide fins 33 and 34 at the top and bottom of the structure. When the parts have been thus assembled together uncured rubber stock, indicated at 35, is molded around the entire structure as indicated by the phantom lines on Fig. 7. This may be natural rubber or synthetic rubber, or similar rubber-like composition. This rubber stock is molded between the rings and between the fins and preferably covers over the outer edges of the fins and rings. It may also enter and fill the clearance spaces between the ribs or splines 16 and the fingers or splines 17, as indicated at 36 on Figs. 8 and 9. After it has been applied it is cured in place.

It will be appreciated that by reason of the interfitting engagement between the fingers 17 on the body part 10 and the ribs 16 on the body part 11, a connection is provided between the two parts that is adequately capable of transmitting the heavy torsional stresses required in well drilling. At the same time circulation fluid may at all times be conducted through the central bore 14. In the course of normal drilling a substantial portion of the weight of the drill pipe is imposed upon the bit. The rubber that is interposed between adjacent rings is capable of withstanding a high degree of compression and although the splined connection between the ribs 16 and the fingers 17 permits of axial movement between the parts 10 and 11, this is resiliently resisted by the rubber interposed between the rings. Thus when the upper part 10 is forced downwardly by the weight of the drill string with respect to the lower part 11, the rubber between the upper half ring 31 and the uppermost ring 25 is compressed. That rubber which is between the uppermost whole ring 25 and the first subjacent ring is under tension. The rubber that is between the second full ring and the third full ring is under compression and the rubber between the third full ring and the fourth full ring is under tension. These various rubber portions distributed as they are between the rings 25 serve to effectively and cooperatively transmit the compression from the upper body part 10 to the lower body part 11 in transmitting weight to the drill collar and to the bit.

In the event that the drill collar or the bit becomes stuck in the well and tension is applied to the drill pipe endeavoring to recover it, the situation is merely reversed, that is, the rubber between the uppermost half ring 31 and the first full ring is under tension but the rubber between the first full ring and the second full ring is under direct compression. Rubber between the second full ring and the third full ring is under tension and rubber between the third full ring and the fourth full ring is under compression. The compressibility of the rubber permits of a limited amount of axial movement between the parts 10 and 11 but resiliently resists disturbance of the parts from a normal or neutral position with respect to each other. As there are relatively large bodies of compressible rubber that transmit stresses these are adequate to transmit downward forces applied to the bit in the case of drilling or upward forces when an effort is made to recover the drill collar and the bit. The resiliency of the rubber, however, retards and somewhat absorbs the transmission of direct shocks or vibrations from the drill collar to the drill string and consequently the life of the drill string may be materially prolonged.

From the above described construction it will be appreciated that a shock absorber is provided for use on rotary well drilling strings which is so designed as to be capable of adequately carrying and transmitting torque, compression and tension. At the same time, however, due to the resiliency of the connection provided between the parts, shocks and vibrations are not transmitted directly from the drill collar to the drill string.

While the shock absorber is normally positioned in the drill string immediately above the drill collar, it may be incorporated in the drill string at other localities either in lieu of or in addition to a shock absorber immediately above the drill collar.

Various changes may be made in the details of the construction without departing from the spirit and scope of the invention as defined by the appended claims.

I claim:

1. A drill pipe shock absorber comprising one member having an axial bore therethrough and attachable at one end to a part of a rotary well drilling string, said member having external vertical grooves thereon defined from each other by external ribs, a second member having fingers or splines vertically slidable in the grooves and attachable at one end to another part of a rotary well drilling string, rings disposed about the fingers and ribs, aternate rings being secured to the ribs and intermediate rings being secured to the fingers, and rubber-like material disposed about and between the rings.

2. A drill pipe shock absorber comprising a hollow member attachable at one end to a part of a rotary well drilling string, said member having external ribs thereon, another member attachable at one end to another part of the rotary well drilling string and having fingers thereon vertically slidable between the ribs, means providing external shoulders on the ribs and on the fingers at least portions of which are in vertical alignment, and compressible material disposed between the shoulders.

3. A drill pipe shock absorber comprising one member having an axial bore therethrough and attachable at one end to a part of a rotary well drilling string, said member having external vertical grooves thereon defined from each other by external ribs, a second member having fingers or splines vertically slidable in the grooves and attachable at one end to another part of a rotary well drilling string, rings disposed about the fingers and ribs, alternate rings being secured to the ribs and intermediate rings being secured to the fingers, said rings having portions in vertical alignment and having vertical fins thereon, the fins on the alternate rings being disposed in staggered relation to the fins on the intermediate rings, and rubber-like material disposed about and between the rings.

4. A drill pipe shock absorber comprising two hollow members each having means at one end by which it may be attached to a drill pipe, one member having vertically extending grooves on the exterior thereof defined from each other by ribs, fingers on the other member extending into the grooves between the ribs so that torque may be transmitted from one member to the other, rings secured to the ribs and fingers respectively and having portions in vertical alignment, each ring encircling both members, and rubber-like material disposed about and between the rings.

5. A drill pipe shock absorber comprising two hollow members each having means at one end by which it may be attached to a drill pipe, one member having vertically extending grooves on the exterior thereof defined from each other by ribs, fingers on the other member extending into the grooves between the ribs so that torque may be transmitted from one member to the other, rings secured to the ribs and fingers respectively, alternate rings being secured to the ribs, the intermediate rings being secured to the fingers, said rings being disposed in encircling relationship to both members and having portions in vertical alignment, and rubber-like material disposed about and between the rings.

6. A drill pipe shock absorber comprising two hollow members each having means at one end by which it may be attached to a drill pipe, one member having vertically extending grooves on the exterior thereof defined from each other by ribs, fingers on the other member extending into the grooves between the ribs so that torque may be transmitted from one member to the other, rings secured to the ribs and fingers respectively, rubber-like material between the ribs and fingers, alternate rings being secured to the ribs and intermediate rings being secured to the fingers, said rings being disposed in encircling relation to both members and having portions in vertical alignment, said rings having vertically extending fins thereon with the fins on the alternate rings being disposed in staggered relationship to the fins on the intermediate rings, and rubber-like material disposed about and between the rings.

7. A drill pipe shock absorber comprising two members each of which is attachable at one end to a part of a rotary well drilling string, means on said members mutually interfitting with each providing a splined connection therebetween whereby torque may be transmitted from one member to the other and axial movement of one member relatively to the other is permissible, rings secured to each of said members, each ring being disposed in encircling relationship to portions of both members, said rings having portions in vertical alignment, and rubber-like material disposed between the rings so that axial movement of one member relatively to the other is permitted only by deformation of said material.

References Cited in the file of this patent
UNITED STATES PATENTS

| | | |
|---|---|---|
| 75,814 | Turner | Mar. 24, 1868 |
| 1,960,688 | Archer | May 29, 1934 |
| 2,199,926 | Swennes | May 7, 1940 |
| 2,212,153 | Eaton et al. | Aug. 20, 1940 |
| 2,325,132 | Haushalter et al. | July 27, 1943 |
| 2,502,790 | Jencick | Apr. 4, 1950 |
| 2,560,644 | Hartzell | July 17, 1951 |
| 2,620,165 | Crickmer | Dec. 2, 1952 |